US005856024A

United States Patent [19]

Parr

[11] Patent Number: 5,856,024

[45] Date of Patent: Jan. 5, 1999

[54] DECORATIVE PARTICULATE MATERIAL AND METHOD OF MAKING AND USING SAME

[76] Inventor: Michael J. Parr, 41 Old English La., Thornhill, Ontario, Canada, L3T 2V2

[21] Appl. No.: 839,575

[22] Filed: Apr. 15, 1997

[51] Int. Cl.$^{6}$ .................... B32B 9/00

[52] U.S. Cl. .................... 428/542.2; 428/15; 428/34.5; 428/143; 428/195; 428/204; 428/206; 428/323; 428/341; 428/403; 428/428; 523/200; 523/201; 502/407; 427/201; 427/205; 427/369; 427/372.2

[58] Field of Search .................... 428/34.5, 15, 143, 428/341, 218, 144, 195, 204, 206, 323, 403, 428, 542.2; 427/369, 372.2, 504, 203, 201, 258, 205; 502/407; 523/200, 201

[56] References Cited

U.S. PATENT DOCUMENTS 3,422,792 1/1969 Rollette .
4,671,208 6/1987 Smith .................... 119/1
5,520,956 5/1996 Kieser et al. .................... 427/203

*Primary Examiner*—William Krynski
*Assistant Examiner*—Abraham Bahta
*Attorney, Agent, or Firm*—Bereskin & Parr

[57] ABSTRACT

A method for making a decorative particulate material in which a clay based cat litter or other suitable particulate material is tumbled in a rotating barrel, sprayed with paint, and while the paint is wet, powdered mica is dispersed over the mixture. The adhesive paint adheres the mica to the particulates. Since only a single layer of mica adheres, the mica is used very efficiently. A clear gelatine-based top coat is sprayed over the mica. The finished particulates of mesh size 30 to 3 mesh, can be used in glass containers as a candle base and serve to contain liquid wax from the burning candle, preventing the wax from contacting the container walls. The resultant clump of wax and particles can easily be removed and thrown out.

8 Claims, 1 Drawing Sheet

DECORATIVE PARTICULATE MATERIAL AND METHOD OF MAKING AND USING SAME

FIELD OF THE INVENTION

This invention relates to a decorative particulate material, having the appearance of decorative small pebbles. The invention also relates to methods of making and using the same. Particularly useful applications of such material are for candles (to contain melted wax from the candles), and to support artificial flower arrangements.

BACKGROUND OF THE INVENTION

Colored rocks and pebbles have found usefulness as decorative materials. Various colored particulates of these kinds have been accepted for use for gardens, patios, aquariums, roofing materials and the like. Traditionally decorative rocks or pebbles have been painted with standard paint or dyes for these purposes. However other coating method have been developed to provide more decorative finishes to rocks, pebbles and other particulates.

For example U.S. Pat. No. 5,262,243 discloses a method for producing a stone with a decorative metallic finish. This method involves adhering metallic sheets to the rock by cutting them to size and then pressing them onto the rock. Crevasses must be filled before a metallic sheet is pressed on, so that the sheet touches all surfaces. This method is performed by hand, and is therefore time consuming and costly.

U.S. Pat. No. 3,422,792 discloses an apparatus for applying reflective glass beads of mesh size 100–50 (as used in road marker paint), to painted stone, utilizing the semi-dry paint to stick the glass beads onto the painted stone. This method requires spraying the glass beads over the rocks, and also requires the rocks to be preheated and dried immediately after the glass bead application. The glass beads simply make the paint appear more reflective, which can also be achieved to a reasonable extent by glossy paints.

Colored sand has also been produced using certain dyes and is typically used for sand art, where alternating layers or designs of colored sand are placed in a clear container for artistic use. However the size of the sand particles and the finish produced limit the use of this material.

Mica containing paints offer a further method of providing an attractive finish to painted surfaces. Mica has properties which allow it to provide a pearlescent or iridescent finish. The individual particles in pearlescent pigments are usually thin crystalline platelets. Pearlescent pigments are normally formulating into paint, which includes agents to suspend and diffuse the pearlescent pigments. In these finishes a large proportion of the mica which produces the pearlescent appearance is covered by the paint pigment, wasting much of the mica (which is expensive), and also requiring complex formulations adequately to suspend the mica in the paint solution.

Therefore it is an object of the present invention to provide a particulate material, having the appearance of small pebbles, with a mica finish, at relatively low cost.

A particularly useful application for such particulate material is to support candles and to contain melted wax from the candles. Candles are commonly burned in glass containers of a variety of shapes and sizes. Glass votive style candle containers are becoming increasingly popular. These containers have downwardly and inwardly sloping sides. In virtually all glass containers in which candles burn down, a wax residue is normally left on the bottom of the container, and in the case of those containers with sloping sides, the wax residue commonly remains on the sides of the container as well. The wax residues are very difficult to remove, and the result is a messy looking and unattractive container.

Various methods have been used to try to eliminate the problem of the wax sticking to the walls of the container. One such method is to place sand in the container underneath the candle. However sand consists of very small size particles which the wax cannot penetrate. Therefore the wax stays on and pools on the surface of the sand and flows to the sides of the container, again sticking to the sides. In addition, sand is so dense that it is difficult to push a candle, particularly a wide diameter candle, sufficiently far into the sand for the sand to provide a support for the candle (to hold the candle upright).

Oils can be used to try to prevent the wax from sticking to the sides and bottom of a container. However the oil may distort the optical properties of the glass container, and in addition the oil can be messy and can create a fire hazard.

Water can be used to prevent wax from sticking to the bottom of a container, because the wax will float in the water. The water therefore acts as a barrier between the melted wax and the bottom of the container, but the water does not protect the sides of the container and may also extinguish the candle prematurely.

One aspect of the present invention therefore addresses the problem of melted wax coating the container wall, as will be described.

BRIEF SUMMARY OF THE INVENTION

In one of its aspects the invention provides a method of making a decorative particulate material. In this aspect the invention provides a method for making a decorative particulate material comprising: selecting a particulate material of clay, rock or the like, in the size range 50 to 2 mesh, coating said particulate material with a coloring material and with mica, and drying the same.

In another aspect the invention provides a decorative particulate material comprising a clay based cat litter coated with paint, said paint being at least partially covered with mica particles, and with a clear top coat sealer over said mica particles.

In another aspect the invention provides a method for supporting a candle in a container in a decorative way and for preventing wax from contacting the sides or bottom of the container. In this aspect the invention provides a method of containing wax from a burning candle comprising: supporting said candle in a bed of particulate non-flammable material in a container, said particulate material comprising particles a majority of which have a size range 30 to 3 mesh, so that wax from said candle when said candle is burned will flow into spaces between said particles to form a clump of wax enveloping some of said particles and will not contact the walls of said container.

Further objects and aspects of the invention will appear from the following description, taken together with the accompanying drawings.

DETAILED DESCRIPTION OF PREFERRED EMBODIMENTS

The invention in its preferred form uses as its major component an earth-like material, typically cat litter. Non-clumping cat litter is commonly made from clays such as fuller's earth, calcium bentonite, palygorskite, sepiolite, attapulgite, diatomaceous earth, common pebbles or gravel, or any other material having a size in the range 50 mesh to 3 mesh. Any of these materials are suitable, but common cat litter from clays such calcium bentonite is preferred. Such cat litter is relatively light in weight, inexpensive, non-toxic, and presents minimal disposal problems.

Figure 1:
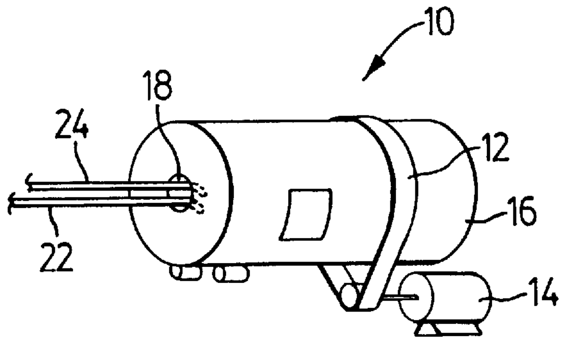
FIG. 1 is a side sectional diagrammatic view of a barrel mixer which may be used in the method of the invention.
Figure 2:
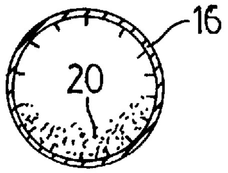
FIG. 2 is an end sectional view of the barrel mixer of FIG. 1 showing particulates therein.

The granules selected are loaded into a rotating barrel containing inside protrusions, for the purpose of agitating and mixing the particles so that they will be coated evenly. A typical such drum is shown at 10 in FIG. 1 and is rotated by a belt 12 driving by a motor 14. One end 16 of the drum is closed, while the other contains a small opening 18 into which the particulate material (e.g. cat litter) is loaded. After the particulate material, indicated at 20 in FIG. 2, is loaded into the barrel 10, nozzles 22, 24 are moved into position to spray suitable coatings through the opening 18 as will be described. The finished product is removed from the barrel via a hatch diagrammatically indicated at 26 in the side of the barrel.

After the particulate material has been loaded into the barrel 10, and after the barrel begins turning, a paint or pigment mixture containing adhesives is sprayed onto the particles through nozzle 22. The composition of the paint solution is formulated depending on the composition of the particulates and the desired final use of the particulates. For example if light weight is desired and the finished particulates are to be used for applications where they will not be exposed to water, then a water based latex paint can be used to coat an earth based particulate such a fuller's earth or calcium bentonite. If a particulate is desired that can be submerged in water, then an epoxy mixture can be sprayed. In all cases, the viscosity and adhesive properties of the mixture to be sprayed should be carefully adjusted so that the mixture will adhere to the particulate used. If the material sprayed is too thick, then the agitation and mixing of the particulates will not take place properly. If the mixture used is too thin, then the coating will not stick to the particulates.

It is preferred, particularly when cat litter of clay material is used, that the barrel turn relatively slowly. For example, the preferred speed for a four foot diameter barrel was between 10 and 20 rpm, preferably about 15 rpm. If the barrel rotates too slowly while the particulates are being sprayed, the particles being sprayed will become too saturated and more paint than necessary will be used. If the barrel rotates too quickly, the clay particles, which are delicate, may break.

In a preferred embodiment mica is used. If desired, the mica can be mixed with the paint and sprayed on in a single application. After the particulates are coated, they are removed to dry. A disadvantage of this process is that as previously mentioned, when the mica is mixed with the paint, much of the mica is effectively wasted.

In a preferred embodiment a more efficient method of utilizing the mica is employed, using a three step application process. The steps are as follows:

(1) First, while the particulates are being rotated in the barrel 10, a paint is sprayed onto the particulates 20. The paint does not contain any mica, and its purpose is to provide a base color for the particulates, and for the color interaction between the color of the paint and the color of the mica. The adhesive properties of the paint which cause the paint to stick to the particles will then also be used to adhere the mica to the paint coated particles.

(2) After the particulates 20 are coated with paint, a small amount of powdered mica in dry form is literally thrown into the rotating barrel 10 and falls onto the particulates. The opening 18 of the barrel 10 is then closed and the barrel 10 is allowed to rotate, dispersing the mica throughout the particulates. This results in a high efficiency in utilizing the mica. Once a flake or particle of mica sticks to a paint coated particle, less mica will stick where that previous piece of mica has been deposited, since the previous piece of mica covers the adhesive that cause the previous piece of mica to stick in place. Some mica overlap does tend to occur, evidently caused by "stickiness" picked up by the mica, but when this occurs, upper particles of mica stick directly over particles of mica beneath them, increasing the effective thickness of the mica (through which the light can partially pass) and increasing the decorative effect. With this process, mica is less likely to be wasted by excessive suspension of the mica within a carrier, as occurs when mica is included in the paint suspension, or when mica is included in a clear top coating suspension. In addition, depositing dry mica over the paint reduces or eliminates a second problem, which is that of particles sticking to each other when drying. Therefore the problem of clumping, and having one particle mar the finished surface of another, is reduced or eliminated. The mica also tends to stick flat against the particulates, improving the reflectivity and pearlescent properties of the final coating.

(3) After the mica has been deposited, and before the paint or other color solution is dried, a final clear adhesive sealer is sprayed onto the particulates to ensure that any loose mica becomes adhered to the particles, and also to cover the mica and reduce the likelihood of its becoming dislodged. The top coat or sealer need be used only in very small amounts and therefore does not result in particles sticking to one another, nor does it adversely affect the surface finish or texture.

Examples of the process are as follows.

EXAMPLE 1

A half gallon of K-mart (trade mark) brand black paint was mixed with ¾ gallon of water to be used as a base pigment. The paint was a standard latex paint. The particles to be coated were 50 lbs. of Kitty White (trade mark) brand cat litter obtained from Mid Florida Mining Company. This was a non-clumping clay base product of approximately 4 to 20 mesh in size. 50 grams of gold mica (Mearlin Micro brand gold 9260M mica) were weighed out for application. A solution to be sprayed over the mica as a top coat end sealer was prepared by diluting 45 grams of 275 bloom gelatin obtained from Dynagel Corporation in 2500 ml of water. The gelatin solution as mentioned was to act as a sticking agent to seal and adhere any loose mica to the particles of cat litter.

The cat litter was loaded into the barrel 10, and the barrel 10 was caused to rotate slowly (at about 15 revolutions per minute). The black paint solution was sprayed through nozzle 22 onto the granules or particulates in the rotating barrel over a period of approximately 10 minutes. At the end of the 10 minutes, after the black paint had been sprayed on, 50 grams of mica were thrown into the barrel and the barrel was sealed so that any airborne mica would not escape. Rotation of the barrel continued for approximately 1.5 minutes, after which 300 ml of the gelatin solution were sprayed onto the granules, through nozzle 24, over a period of approximately 10 minutes.

The barrel 10 was then stopped and the completed and coated particles were removed through hatch 26 and spread onto a screen for drying. Alternatively, and if desired, a stream of heated air may be blown through the drum 10 to dry the particles before they are removed from the drum.

EXAMPLE 2

This examples followed the same process as Example 1. However only ⅓ gallon of water was added to the paint. In addition, the particles to be coated were rock gravel particles ranging in size from 20 to 2 mesh. Approximately 90 lbs. of particles were placed in the barrel. After the three step coating process was performed, the barrel was stopped and the completed and coated particles were removed for drying.

EXAMPLE 3

Premixed paint, usually used as spray paint, and containing pigment and mica together was obtained from Plasti-Kote Company Inc. of Medina, Ohio. This paint is usually used as an automotive touch-up spray paint, and was only one of a number of commercially available premixed mica inclusive paints which are available. Formulations are also readily available for utilizing mica within different paint bases such as water or oil. The Plasti-Kote paint used employed oil as a base.

25 lbs. of Kitty White brand cat litter were placed in the rotating barrel 10. The Plasti-Kote brand paint was sprayed onto the cat litter until all the particles were coated. The barrel was then kept rotating, and air was blown through the barrel, so that the particles would not stick to each other. After 10 minutes, the completed, coated and dried particles were removed.

It will be realized that a variety of paint colors may be used to produce decorative particles. Typical colors which may be used (without limitation) include black, white, yellow, red, green, blue, mauve and many others.

Figure 3:
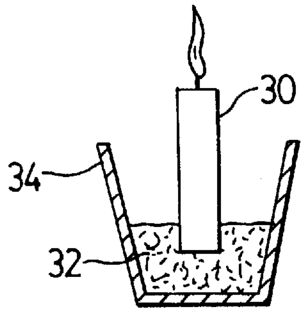
FIG. 3 is a side sectional view of a glass container containing particulate material according to the invention supporting a candle.

As mentioned, colored decorative particles of the kind described are particularly useful as a candle base, to contain wax from the candles. Reference is made to FIG. 3, which shows a candle 30 pushed into particulate material 32 of the kind described (preferably cat litter), in a glass container 34. The particulate material 32 is decorative (since it is colored, and with the presence of mica has a reflective or pearlescent appearance), relatively light weight (reducing shipping costs), and is non-flammable. The candle 30 may be pushed easily to a suitable depth, e.g. ½ to 1 ¼ inches, in the particulate material 32 since the particulate material is not unduly dense and will flow relatively easily.

Figure 4:
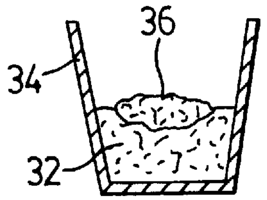
FIG. 4 is a sectional view similar to that of FIG. 3 but showing wax containment after the candle has burned down.
Figure 5:
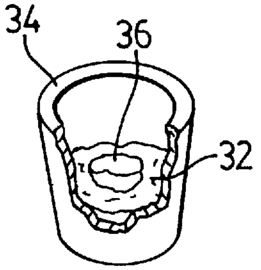
FIG. 5 is a perspective view, partly broken away, of the container of FIG. 4.

When the candle burns down, the remaining wax flows into the spaces between the particles 32 to form a clump 36 (FIGS. 4, 5) consisting of wax enveloping a small quantity of the particulates 32. The size of the clump will depend on the size of the candle, the type of wax used, the size of the particulates (which will affect how the wax penetrates between them), and the like, but typically the clump may be about one-half inch to one inch in height and about twice the candle diameter in width. The entire clump 36 can simply be lifted and removed from the container 34, after which fresh particulate material can be added if needed, and a fresh candle can be inserted into the container. No cleaning of wax from the container walls is normally required. In addition since the particulate material 32 keeps the flame of the candle away from the container walls, the risk that the glass container will be cracked is reduced.

In order to contain the melted wax adequately, the particulate material used is preferable at least largely in the size range 30 to 3 mesh. A preferred range is 25 to 4 mesh. If the particulates are too fine (like sand), the wax will not penetrate adequately between the particulates and will remain on the surface where it will flow to the sides of the container. If the particulates are too coarse (too large), the wax will penetrate too deeply, wasting more particulate material, and the wax may in fact flow completely through the particulate material and contact (or stick to) the container bottom.

While preferred size ranges have been given, if a small percentage of the particles (e.g. 5 to 10 percent) are outside the preferred size range, but the remainder are within the range, the particulates will still trap wax as required. However it is noted that it is preferred to have particles present throughout the size ranges mentioned. If all of the particles are in the larger end of the range (e.g. 2 to 15 mesh), the wax may nevertheless penetrate too deeply. If all the particles are in the smaller portion of the size range, e.g. 25 to 30 mesh, the wax may tend to sit on top of the bed of particles. On the other hand, if the particle sizes are dispersed throughout the size range, then smaller particles will to some extent fill the spaces between the larger particles, allowing the desired amount of penetration of the wax (e.g. about one-half to one inch) but ensuring that the wax will not either sit on top of the particles (in which case it may flow to the walls) or penetrate too deeply (in which case it may contact the bottom of the container).

While particles formed of colored cat litter are preferred, other types of particles may also be used to contain wax in containers in the manner described. For example Wave Castle brand aquarium pebbles have been used, having a mesh size approximately in the range 16 to 4. These pebbles are produced from ordinary rocks, and also serve to contain wax as described.

Figure 6:
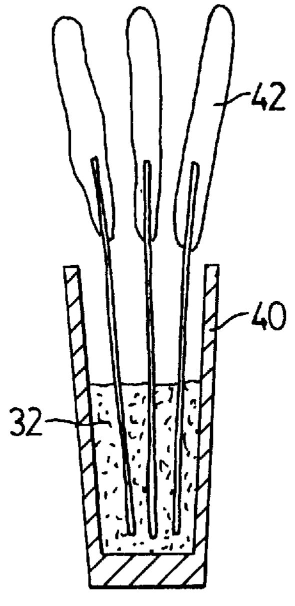
FIG. 6 is a diagrammatic view of a vase showing decorative material according to the invention used to support a flower arrangement.

The colored particulate material according to the invention has various other applications. One such application, as shown in FIG. 6, is as a decorative support in a vase 40 for an artificial flower arrangement 42. The good flowability of the material, particularly when a clay based cat litter is used, allows the flower stems to be pushed readily through the material in most cases, without damaging the stems. Alternatively, the particulate material can be poured into the vase after the flower stems are in place.

While preferred embodiments of invention have been described, other variations are possible and all such variations are intended to be included within the scope of the appended claims.

I claim:

1. A method for making a decorative particulate material comprising: selecting a particulate material of clay in a size range 50 to 2 mesh, coating said particulate material with paint, then while said paint is wet, dispersing a powdered mica over said particulate material so that said powdered mica will stick to said paint, and then coating said mica coated particulate material with a clear sealer.

2. A method according to claim 1 wherein said particulate material is tumbled in a rotating container while being coated with said paint, and while said mica is dispersed thereover, and while said sealer is coated therein.

3. A method according to claim 1 wherein said sealer is a gelatin solution.

4. A method according to claim 2 wherein said paint is a water based paint.

5. A method according to claim 1 wherein said particulate material is a cat litter.

6. A method according to claim 2 wherein said particulate material is a cat litter.

7. A method according to claim 3 wherein said particulate material is a cat litter.

8. A method according to claim 4 wherein said particulate material is a cat litter.

* * * * *